(12) United States Patent
Dong et al.

(10) Patent No.: US 12,215,214 B2
(45) Date of Patent: Feb. 4, 2025

(54) LOW DENSITY POLYETHYLENE WITH ENHANCED ADHESION-TO-ALUMINUM FOIL BY BLENDING-IN ACID COPOLYMER RESINS

(71) Applicant: Dow Global Technologies LLC, Midland, MI (US)

(72) Inventors: Yifan Y. Dong, Lake Jackson, TX (US); Jong Young Lee, Sugar Land, TX (US); Barry A. Morris, Wilmington, DE (US); Teresa P. Karjala, Lake Jackson, TX (US); Jianping Pan, Shanghai (CN); Guihong Liao, Shanghai (CN); I-Hwa Lee, Wilmington, DE (US); Carmelo Declet Perez, Pearland, TX (US); Michael B. Biscoglio, Blue Bell, PA (US)

(73) Assignee: Dow Global Technologies LLC, Midland, MI (US)

( * ) Notice: Subject to any disclaimer, the term of this patent is extended or adjusted under 35 U.S.C. 154(b) by 239 days.

(21) Appl. No.: 17/631,150

(22) PCT Filed: Jul. 27, 2020

(86) PCT No.: PCT/US2020/043658
§ 371 (c)(1),
(2) Date: Jan. 28, 2022

(87) PCT Pub. No.: WO2021/021693
PCT Pub. Date: Feb. 4, 2021

(65) Prior Publication Data
US 2022/0267578 A1     Aug. 25, 2022

(30) Foreign Application Priority Data
Jul. 31, 2019   (WO) ................ PCT/CN2019/098558

(51) Int. Cl.
*C08L 23/08* (2006.01)
*C09D 123/06* (2006.01)

(52) U.S. Cl.
CPC ........ *C08L 23/0815* (2013.01); *C09D 123/06* (2013.01); *C08L 2207/066* (2013.01)

(58) Field of Classification Search
None
See application file for complete search history.

(56) References Cited

U.S. PATENT DOCUMENTS

| | | |
|---|---|---|
| 3,264,272 A | 8/1966 | Rees |
| 3,322,734 A | 5/1967 | Rees et al. |
| 3,410,928 A * | 11/1968 | Baum ............. C08L 23/02 525/221 |
| 3,857,754 A * | 12/1974 | Hirata ............. B32B 7/12 428/476.3 |
| 4,312,902 A | 1/1982 | Murase et al. |
| 4,766,174 A | 8/1988 | Statz |
| 6,437,046 B1 | 8/2002 | Morris |
| 6,500,556 B1 | 12/2002 | Morris et al. |
| 7,820,776 B2 | 10/2010 | Neuteboom et al. |
| 8,541,081 B1 | 9/2013 | Ranganathan et al. |
| 9,228,036 B2 | 1/2016 | Berbee et al. |
| 9,334,348 B2 | 5/2016 | Berbee et al. |
| 9,394,389 B2 | 7/2016 | Berbee et al. |
| 9,783,352 B2 | 10/2017 | Hausmann et al. |
| 10,144,789 B2 | 12/2018 | Nummila-Pakarinen et al. |
| 2002/0198323 A1* | 12/2002 | Morris ............. C09J 123/06 525/240 |
| 2004/0043238 A1 | 3/2004 | Wuest et al. |
| 2006/0014871 A1 | 1/2006 | Toriumi et al. |
| 2006/0073297 A1 | 4/2006 | Glick et al. |
| 2007/0225445 A1* | 9/2007 | Nguyen ............. C08L 23/06 525/240 |
| 2009/0131593 A1 | 5/2009 | Perdomi |

(Continued)

FOREIGN PATENT DOCUMENTS

| | | | |
|---|---|---|---|
| CN | 104080851 A | 10/2014 | |
| EP | 0721975 A1 | 7/1996 | |
| EP | 0928797 * | 7/1999 | ............. C08F 10/02 |

(Continued)

OTHER PUBLICATIONS

Chinese Office Action dated Sep. 29, 2023, pertaining to CN Patent Application No. 202080053890.6, 14 pgs.
Communication pursuant to Article 94(3) EPC dated Sep. 29, 2023, pertaining to EP Patent Application No. 20754539.3, 3 pgs.
Brazil Office Action dated Oct. 24, 2023, pertaining to BR Patent Application No. BR112022001345-0, 4 pgs.
Brazil Office Action dated Oct. 17, 2023, pertaining to BR Patent Application No. BR112022001238-1, 6 pgs.
Brazil Office Action dated Oct. 24, 2023, pertaining to Brazilian Patent Application No. BR112022001549-6, 3 pgs.

(Continued)

*Primary Examiner* — John Vincent Lawler
(74) *Attorney, Agent, or Firm* — Dinsmore & Shohl LLP

(57) ABSTRACT

The polymer blend includes at least 90% by weight low density polyethylene (LDPE) polymer and from 1% to 10% by weight acid copolymer based on the total weight of the polymer blend. In the polymer blend, the LDPE polymer has a melt index (I? 2 #191) from 2 g/10 min to 8 g/10 min as determined in accordance with ASTM D1238, and a molecular weight distribution from 5 to 10.5. In the polymer blend, the acid copolymer is a polymerized reaction product of: at least 60% by weight ethylene, based on the total weight of the monomers present in the ethylene acid copolymer; from 1% to 20% by weight monocarboxylic acid monomer, based on the total weight of the monomers present in the ethylene acid copolymer; and from 0 to 20% by weight alkyl acrylate monomer, based on the total weight of the monomers present in the ethylene acid copolymer.

20 Claims, No Drawings

(56) References Cited

U.S. PATENT DOCUMENTS

| | | | | |
|---|---|---|---|---|
| 2013/0164552 | A1* | 6/2013 | Wang | C09D 123/0815 525/240 |
| 2016/0304638 | A1 | 10/2016 | Den Doelder et al. | |

FOREIGN PATENT DOCUMENTS

| | | | |
|---|---|---|---|
| EP | 1325092 | A2 | 7/2003 |
| EP | 1854626 | A1 | 11/2007 |
| EP | 2156949 | B1 | 11/2014 |
| GB | 1041065 | A | 9/1966 |
| JP | H03192607 | A | 8/1991 |
| JP | H09109324 | A | 4/1997 |
| JP | 2002500250 | A | 1/2002 |
| JP | 2003118048 | A | 4/2003 |
| JP | 2000001556 | A | 11/2007 |
| JP | 2015000883 | A | 1/2015 |
| JP | 2015503664 | A | 2/2015 |
| WO | 0107531 | A2 | 2/2001 |
| WO | 0228974 | A2 | 4/2002 |
| WO | 2005005534 | A1 | 1/2005 |
| WO | 2013083285 | A1 | 6/2013 |
| WO | 2018094199 | A1 | 5/2018 |
| WO | 2019022974 | A1 | 1/2019 |

OTHER PUBLICATIONS

ID Office Action dated Aug. 14, 2023, pertaining to ID Patent Application No. P00202201366, 6 pgs.
Balke et al. "A Strategy for Interpreting Multidetector Size-Exclusion Chromatograph Data II", Multidetector SEC Data in Plastic Waste Recovery (1992), 11 pgs.
International Search Report and Written Opinion dated Oct. 12, 2020, pertaining to Int'l Appl. No. PCT/US2020/043485 filed Jul. 24, 2020, 12 pgs.
International Search Report and Written Opinion dated Nov. 30, 2020, pertaining to Int'l Appl. No. PCT/US2020/044200 filed Jul. 30, 2020, 14 pgs.
International Search Report and Written Opinion dated Apr. 29, 2020, pertaining to Int'l Appl. No. PCT/CN2019/098558 filed Jul. 31, 2019, 11 pgs.
International Search Report and Written Opinion dated Oct. 28, 2020, pertaining to Int'l Appl. No. PCT/US2020/043658 filed Jul. 27, 2020, 14 pgs.
Kratochvil, P., Classical Light Scattering from Polymer Solutions, Elsevier, Oxford, NY (1987), 32 pgs.
Mourey et al. "A Strategy for Interpreting Multidetector Size-Exclusion Chromatography Data I" Systematic Approach to Multidetector SEC Data (1992), 11 pgs.
Williams et al. "The Construction of a Polyethylene Calibration Curve for Gel Permeation Chromatography Using Polystyrene Fractions" vol. 6, pp. 621-624 (1968), 4 pgs.
Zimm "Apparatus and Methods for Measurement and Interpretation of the Angular Variation of Light Scattering; Preliminary Results on Polystyrene Solutions" The Journal of Chemical Physics vol. 16, No. 12 (1948), 18 pgs.
161/162 Communication dated Mar. 9, 2022, pertaining to European Patent Application No. 20754597.1, 3 pgs.
International Preliminary Report on Patentability dated Feb. 1, 2022, pertaining to PCT/US2020/044200 6 pgs.
161/162 Communication dated Mar. 9, 2022, pertaining to European Patent Application No. 20754539.1, 3 pgs.
International Preliminary Report on Patentability dated Feb. 10, 2022, pertaining to PCT/US2020/043485, 6 pgs.
International Preliminary Report on Patentability dated Feb. 1, 2022, pertaining to PCT Application No. PCT/US2020/043658, 6 pgs.
161/162 Communication dated Mar. 9, 2022, pertaining to European Patent Application No. 20754551.8, 3 pgs.
Chinese Office Action dated Nov. 21, 2023, pertaining to CN Patent Application No. 202080052468.9, 14 pgs.
Chinese Office Action dated Dec. 7, 2023, pertaining to CN Patent Application No. 202080055564.9, 14 pgs.
Russian Office Action dated Jan. 17, 2024, pertaining to RU Patent Application No. 2022 104 735, 20 pgs.
Argentine Substantive Examination Report dated Jan. 18, 2024, pertaining to AR Patent Application No. 20200102036, 2 pgs.
Argentine Substantive Examination Report dated Jan. 18, 2024, pertaining to AR Patent Application No. 20200102033, 2 pgs.
Argentine Substantive Examination Report dated Mar. 1, 2024, pertaining to AR Patent Application No. 20200102022, 3 pgs.
Chinese Office Action dated Jun. 27, 2024, pertaining to CN Patent Application No. 202080055564.9, 10 pgs.
Japanese Office Action dated Aug. 6, 2024, pertaining to JP Patent Application No. 2022-50191, 12 pgs.
Japanese Office Action dated Aug. 20, 2024, pertaining to JP Patent Application No. 2022-505490, 8 pgs.
Japanese Office Action dated Jul. 23, 2024, pertaining to JP Patent Application No. 2022-504158, 10 pgs.
European Article 94(3) Communication dated Jul. 31, 2024, pertaining to EP Patent Application No. 20754539.3, 3 pgs.
US Non-Final Office Action dated Apr. 25, 2024, pertaining to U.S. Appl. No. 17/631,091, 7 pgs.
Indonesia Substantive Examination Report dated Apr. 4, 2024, pertaining to ID Patent Application No. P00202201385, 6 pgs.
Chinese Office Action dated May 22, 2024, pertaining to CN Patent Application No. 202080052468.9, 14 pgs.
US Office Action dated Oct. 9, 2024, pertaining to U.S. Appl. No. 17/631,091, 9 pgs.
US Notice of Allowance dated Sep. 11, 2024, pertaining to U.S. Appl. No. 17/631,107, 12 pgs.
Chinese Office Action dated Aug. 26, 2024, pertaining to CN Patent Application 2020800524689, 14 pgs.

* cited by examiner

LOW DENSITY POLYETHYLENE WITH ENHANCED ADHESION-TO-ALUMINUM FOIL BY BLENDING-IN ACID COPOLYMER RESINS

CROSS-REFERENCE TO RELATED APPLICATIONS

This application is a National Stage Entry under 35 U.S.C. § 371 of International Patent Application No. PCT/US2020/043658, filed Jul. 27, 2020, which claims priority to International Patent Application PCT/CN2019/098558, filed on Jul. 31, 2019, the entire disclosures of both of which are hereby incorporated by reference.

TECHNICAL FIELD

Embodiments of the present disclosure generally relate to a polymer blend for extrusion coating or lamination and an improved adhesion-to-metal; and to films and coated substrates that include the polymer blends.

BACKGROUND

Low density polyethylene (LDPE) is widely used in extrusion coating to make food packaging such as condiment sachets, chip bags, and many flexible packages. However, the low bonding strength of LDPE to polar substrates such as aluminum foil and metalized films can cause the packaging to fail, thereby compromising barrier properties and leading to spoiled food. Adhesion to polar substrates is driven by polar functional groups such as carbonyl groups. LDPE is non-polar and, as a result, generally has low adhesion to foil and metalized films. To enhance the adhesion, the LDPE may be extruded and coated at high temperatures (typically 280-330° C.). High-temperature extrusion coating promotes oxidation at the polymer surface, which can generate carbonyl groups resulting in better adhesion. In addition to temperature, the level of oxidation is also related to the time the hot polymer is exposed to air prior to contacting the substrate to be coated. Extrusion coating lines are run at line speeds from 100 to 800 meters per minute/min). Fast line speeds can lead to much less oxidation. When less oxidation occurs, fewer carbonyl groups are formed, thereby decreasing the ability of the LDPE coating to adhere to the polar substrate.

SUMMARY

Ongoing needs exist for polymers or polymer blends that are processable at medium to high extrusion coating line speeds (for example, 200 m/min to 800 m/min) and adhere well to polar substrates such as aluminum foil.

Embodiments of this disclosure include polymer blends. The polymer blends include at least 90% by weight low density polyethylene (LDPE) polymer and from 1% to 10% by weight acid copolymer based on the total weight of the polymer blend. In the polymer blends, the LDPE polymer has a melt index ($I_2$) from 2 g/10 min to 8 g/10 min as determined in accordance with ASTM D1238 (190° C., 2.16 kg), and a molecular weight distribution (MWD) from 5 to 10.5 as determined by a conventional gel permeation chromatography method. In the polymer blends, the acid copolymer is a polymerized reaction product of: at least 60% by weight ethylene monomer, based on the total weight of the monomers present in the ethylene acid copolymer; from 1% to 20% by weight monocarboxylic acid monomer, based on the total weight of the monomers present in the ethylene acid copolymer; and from 0 to 20% by weight alkyl acrylate monomer, based on the total weight of the monomers present in the ethylene acid copolymer.

Embodiments of this disclosure include a coated metal substrate. The coated metal substrate includes a metal substrate and a film comprising the polymer blend of any polymer blend of this disclosure adhered to the metal substrate.

DETAILED DESCRIPTION

Embodiments of this disclosure include a polymer blend. The polymer blend includes at least 90% by weight low density polyethylene (LDPE) polymer and from 1% to 10% by weight acid copolymer based on the total weight of the polymer blend.

In some embodiments of the polymer blend, the LDPE polymer has a melt index ($I_2$) from 2 g/10 mins to 8 g/10 mins as determined in accordance with ASTM D1238 (190° C., 2.16 kg). In various embodiments, the LDPE homopolymer has a melt index ($I_2$) from 2 g/10 mins to 7.7 g/10 mins, 2 g/10 mins to 6 g/10 mins, 2 g/10 mins to 5 g/10 mins, or from 2 g/10 mins to 4.5 g/10 mins.

In one or more embodiments of the polymer blend, the LDPE polymer has a molecular weight distribution (MWD=Mw/Mn) from 5 to 11, from 8 to 10.5, or 8.5 to 11, as determined by a conventional gel permeation chromatography (GPC) method.

The LDPE polymer may have a density of 0.910 g/cc to 0.930 g/cc. In some embodiments, the LDPE polymer may have a density of from 0.910 g/cc to 0.920 g/cc, from 0.916 g/cc to 0.930 g/cc, from 0.918 g/cc to 0.926 g/cc, or 0.915 g/cc to 0.920 g/cc.

In some embodiments of the polymer blend, the LDPE polymer has a density of 0.910 $g/cm^3$ to 0.930 $g/cm^3$ and an MWD of 8.5 to 10.5.

In one or more embodiments, the polymer blend includes from 1% to 10% by weight of acid copolymer. In some embodiments, the polymer blend includes from 2% to 8% by weight, 3% to 6% by weight, or 3% to 5% by weight of the acid copolymer.

In various embodiments of the polymer blend, the acid copolymer is a polymerized reaction product of: at least 60% by weight ethylene, based on the total weight of the monomers present in the ethylene acid copolymer; from 1% to 20% by weight monocarboxylic acid monomer, based on the total weight of the monomers present in the ethylene acid copolymer; and from 0 to 20% by weight alkyl acrylate monomer, based on the total weight of the monomers present in the ethylene acid copolymer.

In one or more embodiments, the monocarboxylic acid monomer of the acid copolymer may be present in the acid copolymer in an amount of from 1 wt. % to 15 wt. % based on the total weight of the monomers present in the ethylene-based polymer. In some embodiments, the monocarboxylic acid monomer may be present in an amount of from 2 wt. % to 20 wt. %, from 2 wt. % to 10 wt. %, or from 2 wt. % to 5 wt. % based on the total weight of the monomers present in the acid copolymer.

In some embodiments of the polymer blend, the ethylene acid copolymer includes at least 65% by weight ethylene monomer, based on the total weight of the monomers in the ethylene acid copolymer; from 1% to 15% by weight monocarboxylic acid monomer, based on the total weight of the monomers in the ethylene acid copolymer; and from 0 to 15% by wt. alkyl acrylate based on the total weight of the monomers in the ethylene acid copolymer.

In one or more embodiments, the ethylene acid copolymer includes at least 75% by weight ethylene; from 2% to 6% by weight monocarboxylic acid monomer, based on the total weight of the monomers in the ethylene acid copolymer and from 1% to 15% by weight alkyl acrylate based on the total weight of the monomers in the ethylene acid copolymer.

In various embodiments of the polymer blend, the monocarboxylic acid monomer comprises acrylic acid, methacrylic acid, or combinations thereof.

In some embodiments of the polymer blend, the alkyl acrylate of the acid copolymer may be, by way of example and not limitation, methyl acrylate, ethyl acrylate, n-butyl acrylate, iso-butyl acrylate, or combinations thereof. In various embodiments, the alkyl acrylate is a $C_2$-$C_8$-alkyl acrylate, that is, an alkyl acrylate having an alkyl group with from 1 to 8 carbons.

In one or more embodiments of the polymer blend, the acid copolymer has a melt index ($I_2$) from 2 g/10 mins to 30 g/10 mins as determined in accordance with ASTM D1238 (190° C., 2.16 kg). In some embodiments, the acid copolymer has a melt index ($I_2$) from 10 g/10 mins to 30 g/10 mins.

In one or more embodiments of this disclosure, the polymer blend includes a linear low density polyethylene (LLDPE) polymer in addition to the LDPE polymer and the acid copolymer. In one or more embodiments, the LLDPE polymer has a melt index ($I_2$) from 0.5 g/10 min to 30 g/10 min as determined in accordance with ASTM D1238 (190° C., 2.16 kg), and a density of 0.910 g/cm$^3$ to 0.925 g/cm$^3$.

In one or more embodiments of the polymer blend, the ethylene acid copolymer has a melt index ($I_2$) from 2 g/10 min to 12 g/10 min as determined in accordance with ASTM D1238 (190° C., 2.16 kg).

Embodiments of this disclosure include coating, in which the coating includes a polymer blend of this disclosure.

Embodiments of this disclosure include a coated substrate. In some embodiments, the coated substrate is a coated polymer substrate. The coated polymer substrate includes a polymer substrate and a coating on the polymer substrate that includes any polymer blend of this disclosure.

In one or more embodiments of the coated polymer substrate, the polymer substrate includes polyethylene, polypropylene, polyethylene terephthalate, or polyamide. In some embodiments, the polymer substrate is uniaxially or biaxially oriented.

In some embodiments, the coated substrate includes a coated metal substrate. The coated metal substrate includes a metal substrate and a coating on the metal substrate. The coating includes any polymer blend of this disclosure.

In some embodiments, the metal substrate comprises aluminum or a metallized polymer substrate, in which the coating is adhered to the metalized surface of the metallized polymer substrate. In one or more embodiments, the polymer substrate is polyethylene terephthalate (PET), polyethylene, polypropylene, or polyamide.

Embodiments of this disclosure include a multilayer structure. In embodiments, the multilayer structure includes a second substrate in contact with the coating of the coated substrate.

In one or more embodiments, the coating has an peel strength of at least 0.6 N/in, at least 0.7 N/in, at least 1 N/in, or at least 2 N/in as measured by ASTM F904.

Polymerizations

For a high pressure, free-radical initiated polymerization process, two basic types of reactors are known. The first type is an agitated autoclave vessel having one or more reaction zones (the autoclave reactor). The second type is a jacketed tube having one or more reaction zones (the tubular reactor).

The pressure in each autoclave and tubular reactor zone of the process is typically from 100 MPa to 400 MPa, from 120 MPa to 360 MPa, or from 150 MPa to 320 MPa.

The polymerization temperature in each tubular reactor zone of the process is typically from 100° C. to 400° C., from 130° C. to 360° C., or from 140° C. to 330° C.

The polymerization temperature in each autoclave reactor zone of the process is typically from 150° C. to 300° C., from 165° C. to 290° C., or from 180° C. to 280° C.

A tubular reactor having at least three reaction zones may be used to produce the LDPE of the polymer blends.

For producing LDPE, a high pressure, free-radical initiated polymerization process is typically used. Typically, a jacketed tube is used as a reactor, which has one or more reaction zones. Suitable, but not limiting, reactor lengths may be from 100 to 3000 meters (m), or from 1000 to 2000 meters. The beginning of a reaction zone for the reactor is typically defined by the side injection of initiator of the reaction, ethylene, chain transfer agent (or telogen), as well as any combination thereof. A high pressure process can be carried out in one or more tubular reactors, having one or more reaction zones, or in a combination of autoclave and tubular reactors, each comprising one or more reaction zones.

A chain transfer agent can be used to control molecular weight. In a preferred embodiment, one or more chain transfer agents (CTAs) are added to an inventive process. Typical CTA's that can be used include, but are not limited to, propylene, n-butane, 1-butene, isobutane, propionaldehyde, and methyl ethyl ketone. In one embodiment, the amount of CTA used in the process is from 0.03 to 10 weight percent of the total reaction mixture. Ethylene used for the production of the LDPE may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases ethylene from the recycle loop may be used. In one embodiment, the ethylene-based polymer is a LDPE.

The ethylene acid copolymer may be prepared by standard free-radical copolymerization methods, using high pressure, operating in a continuous manner. Monomers are fed into the reaction mixture in a proportion relative to the monomer's activity and the amount of the monomer desired to be incorporated in the copolymer. In this way, uniform, near-random distribution of monomer units along the chain is achieved. Unreacted monomers may be recycled. Additional information on the preparation of ethylene acid copolymers can be found in U.S. Pat. Nos. 3,264,272 and 4,766,174, each of which is hereby incorporated by reference in its entirety.

Initiators

The process to produce the LDPE of the polymer blend of this disclosure is a free-radical polymerization process. The type of free-radical initiator to be used in the present process is not critical, but preferably one of the initiators applied should allow high-temperature operation in the range from 300° C. to 350° C. Examples of suitable free-radical initiators include organic peroxides, such as peresters, perketals, peroxy ketones, percarbonates, and cyclic multifunctional peroxides. These organic peroxy initiators are added to the reactor at from 0.005 wt. % to 0.2 wt %, based on the total weight of polymerizable monomers in the reactor. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

In one embodiment, an initiator is added to at least one reaction zone of the polymerization reactor. In a further embodiment, the initiator is added to the reactor or the polymerization process at a peak polymerization temperature from 320° C. to 350° C. In a further embodiment, the initiator comprises at least one peroxide group incorporated in a ring structure.

Examples of initiators suitable for polymerizing polyethylene include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. Additional initiators are disclosed in International Publication Nos. WO 02/14379 and WO 01/68723, both of which are hereby incorporated by reference within this disclosure.

Polymer Fabrication

The polymer blend of this disclosure may be employed in a variety of thermoplastic fabrication processes to produce useful articles, including extrusion coatings and extrusion laminations.

Definitions

Unless stated to the contrary, implicit from the context, or customary in the art, all parts and percentages are based on weight, and all test methods are current as of the filing date of this disclosure.

The terms "blend" or "polymer blend," as used in this disclosure, mean an intimate physical mixture of two or more polymers without chemical reaction between or among the polymers. A blend may be miscible and without phase separation at a molecular level or may be immiscible and evidence some degree of phase separation at a molecular level. A blend may include, but need not include, one or more domain configurations that can be determined from transmission electron spectroscopy, light scattering, x-ray scattering, and other methods known in the art. The blend may be affected by physically mixing the two or more polymers on a macro level or on a micro level. Examples of physical mixing on a macro level include melt blending of resins or compounding. An example of physical mixing on a micro level includes simultaneous formation of the two or more polymers within the same reactor.

The term "polymer" refers to a polymeric compound prepared by polymerizing monomers, whether of the same or a different type. The generic term polymer thus embraces the terms "homopolymer" and "copolymer." The term "homopolymer" refers to polymers prepared from only one type of monomer; the term "copolymer" refers to polymers prepared from two or more different monomers.

The term "ethylene-based polymer" or "ethylene polymer" refers to a polymer that comprises at least 50% by weight polymerized ethylene, based on the total weight of the polymer. Ethylene-based polymers and ethylene polymers may be ethylene homopolymers or may include one or more than one comonomer, provided ethylene has the greatest weight fraction of the polymer, among all monomers in the polymer.

The term "monocarboxylic acid monomer" means a molecule having a reactive portion, such as a vinyl or vinylene, that may bond to other monomers to form a polymer and a carboxylic acid (—C(O)OH) moiety that is not included in the reactive portion.

Test Methods

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792, Method B.

Melt Index: Melt index, or I2, (grams/10 minutes or dg/min) is measured in accordance with ASTM D 1238, Condition 190° C./2.16 kg, Procedure B.

Triple Detector Gel Permeation Chromatography (3D-GPC)

The chromatographic system includes a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment is set at 160° C., and the column compartment is set at 150° C. The columns that may be used include 4 Agilent "Mixed A" 30 cm 20-micron linear mixed-bed columns. The chromatographic solvent that may be used includes 1,2,4 trichlorobenzene and that contains 200 ppm of butylated hydroxytoluene (BHT). The solvent source is nitrogen sparged. The injection volume that may be used includes 200 microliters (4) and the flow rate was 1.0 milliliters/minute.

Calibration of the GPC column set is performed with at least 20 narrow molecular weight distribution polystyrene standards with molecular weights ranging from 580 to 8,400,000 arranged in 6 "cocktail" mixtures with at least a decade of separation, meaning that there is an order of magnitude of approximately a factor of 10, between individual molecular weights. The standards are purchased from Agilent Technologies. The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80 degrees Celsius with gentle agitation for 30 minutes. The polystyrene standard peak molecular weights are converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad (1)$$

where M is the molecular weight, A has a value of 0.4315 and B is equal to 1.0.

A fifth order polynomial is used to fit the respective polyethylene-equivalent calibration points. A small adjustment to A (from approximately 0.415 to 0.44) is made to correct for column resolution and band-broadening effects such that NIST standard NBS 1475 is obtained at 52,000 g/mol Mw.

The total plate count of the GPC column set is performed with Eicosane (prepared at 0.04 g in 50 milliliters of TCB and dissolved for 20 minutes with gentle agitation.) The plate count (Equation 2) and symmetry (Equation 3) are measured on a 200 microliter injection according to the following equations:

$$\text{Plate Count} = 5.54 * \left( \frac{(RV_{PeakMax})}{\text{Peak Width at } \frac{1}{2} \text{ height}} \right)^2 \quad (EQ2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{onetenthheight} - RV_{Peakmax})}{(RV_{Peakmax} - \text{Front Peak } RV_{onetenthheight})} \quad (EQ3)$$

where RV is the retention volume in milliliters and the peak width is in milliliters, Peak max is the maximum position of the peak, one tenth height is $\frac{1}{10}$ height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples are prepared in a semi-automatic manner with the PolymerChar "Instrument Control" Software, wherein the samples are weight-targeted at 2 mg/mL, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ are based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ4)$$

$$Mw_{(GPC)} = \frac{\sum_i (IR_i * M_{polyethylene_i})}{\sum_i IR_i} \quad (EQ5)$$

$$Mz_{(GPC)} = \frac{\sum_i (IR_i * M_{polyethylene_i}^2)}{\sum_i (IR_i * M_{polyethylene_i})} \quad (EQ6)$$

In order to monitor the deviations over time, a flowrate marker (decane) is introduced into each sample via a micropump controlled with the PolymerChar GPC-IR system. This flowrate marker (FM) was used to linearly correct the pump flowrate (Flowrate$_{(nominal)}$) for each sample by RV alignment of the respective decane peak within the sample (RV$_{(FM\ Sample)}$) to that of the decane peak within the narrow standards calibration (RV$_{(FM\ Calibrated)}$). Any changes in the time of the decane marker peak is assumed to be related to a linear-shift in flowrate (Flowrate$_{(effective)}$) for the entire run.

To facilitate the highest accuracy of a RV measurement of the flow marker peak, a least-squares fitting routine is used to fit the peak of the flow marker concentration chromatogram to a quadratic equation. The first derivative of the quadratic equation is used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} * (RV_{(FM\ Calibrated)} / RV_{(FM\ Sample)}) \quad (7)$$

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

Extrusion coating: Extrusion coating trials are performed using a Black-Clawson line following standard coating procedures. In brief, monolayer coatings are extruded using a 3-layer extrusion coating (EC) line, using only the primary 3.5-inch diameter extruder (30:1 L/D) powered by a 150 HP Eurotherm drive. The primary barrel has six heater zones with a temperature profile 179° C., 230° C., 286° C., 316° C., 317° C., 318° C. (354° F., 446° F., 546° F., 601° F., 603° F. 605° F.). A Nordson EDI 36-inch Autoflex™ Die is used, and a 0.5-0.6 mm (0.020") die gap and a 153 mm (6-inch) air gap are set. The line is equipped with a 30-inch chill roll, nip roll, backing roll, and shear slitter.

Extrusion coating runs are performed at 25 gsm at 600° F. (315° C.), 90 RPM screw speed and 250 lbs/hr, 24-inch die width, 20-mil die gap, which translates into a coating thickness of 1.2 mil (30 microns) at 440 ft/min.

Peel Strength as Measured by the Peel Test

The polymer or the polymer blend is extrusion-coated on an aluminum sheet (aluminum foil laminated with LDPE and white paper with a total thickness of 5.2 to 5.5 mil) via an extrusion coating process. The coating is applied to the aluminum side and has a thickness of 1.2 mil. Masking tape is placed on a portion of the aluminum sheet before the polymer or polymer blend is extruded and coated onto the aluminum sheet. Since there is weak adhesion between the masking tape and coating, the masking tape can be peeled-off the coating prior to the Peel Test. Then, the Peel Test is used to obtain the peel strength between the coating and the aluminum sheet.

Prior to testing of the peel strength, the samples are conditioned for a minimum of 40 hrs at 23° C. (±2° C.) and 50% (±10%) relative humidity (R.H).

The extrusion-coated sheet to be tested is cut into 1 inch wide strips along the machine direction with the longer side oriented along the machine direction. The coating is peeled off from the aluminum sheet (starting from the location with the masking tape), and then the two jaws of the tensile test machine grips the ends of the peeled-off coating and aluminum sheet. Then the whole sample is slowly pulled at 1 in/min to remove the slack. The sample is then tested at 12 in/min, five specimens are tested and the average peak load and average load over 3 inches (from 1 inch to 4 inches) are reported.

The peel strength improvement (%) is obtained from the equation below.

$$\frac{(\text{peel strength of } LDPE+\text{ionomer}) - (\text{peel strength of pure } LDPE)}{\text{peel strength of pure } LDPE} * 100$$

The peel strength is the peak load obtained from the peel test.

EXAMPLES

Twenty-five example compositions were prepared, and polymer characteristics of each were measured. Each of the example compositions was a blend of a LDPE homopolymer and an acid copolymer. The properties of the LDPE homopolymers are listed in Table 1.

TABLE 1

Polymer Properties of the LDPE homopolymer

| Product | Melt Index (dg/min) | MWD (Mw/Mn) | Density (g/cm³) |
|---|---|---|---|
| AGILITY EC 7030 | 2.5 | 8.97 | 0.918 |
| AGILITY EC 7000 | 3.9 | 8.82 | 0.919 |
| LDPE 5005 | 5.7 | 9.29 | 0.922 |
| LDPE PG 7008 | 7.5 | 8.83 | 0.918 |
| LDPE 6211 | 2.3 | 11.00 | 0.918 |
| LDPE 722 | 8.0 | 10.81 | 0.918 |
| LDPE 4010 | 10 | 11.89 | 0.917 |
| LDPE 4016 | 16 | 9.54 | 0.919 |

Example 1 was a polymer blend prepared from 95% by weight AGILITY™ EC 7030 manufactured by Dow, Inc. as the LDPE component and 5% by weight acid copolymer. The acid copolymer included 2% by weight methacrylic acid, 6% by weight iso-butyl acrylate, and 92% by weight ethylene based on the total weight of the monomers of the acid copolymer and had a melt index of 10 dg/min. Example 2 was a polymer blend prepared from 95% by weight AGILITY™ EC 7030 manufactured by Dow, Inc. as the LDPE component and 5% by weight acid copolymer. The acid copolymer included 10% by weight methacrylic acid, 10% by weight iso-butyl acrylate, and 80% by weight ethylene based on the total weight of the monomers of the acid copolymer and had a melt index of 10 dg/min.

Example 3 was a polymer blend prepared from 95% by weight AGILITY™ EC 7030 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 4 was a polymer blend prepared from 95% by weight AGILITY™ EC 7000 manufactured by Dow, Inc. as the LDPE component and 5% by weight acid copolymer. The acid copolymer included 9% by weight methacrylic acid and 91% by weight ethylene based on the total weight of the monomers of the acid copolymer and had a melt index of 10 dg/min.

Example 5 was a polymer blend prepared from 95% by weight AGILITY™ EC 7000 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 6 was a polymer blend prepared from 95% by weight LDPE 5005 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 7 was a polymer blend prepared from 95% by weight LDPE PG 7008 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 8 was a polymer blend prepared from 95% by weight LDPE 4016 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 9 was a polymer blend prepared from 95% by weight LDPE 6211 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 10 was a polymer blend prepared from 95% by weight LDPE 722 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 11 was a polymer blend prepared from 95% by weight LDPE 4010 manufactured by Dow, Inc. as the LDPE component and 5% by weight acid copolymer. The acid copolymer included 2% by weight methacrylic acid, and 6% of iso-butyl acrylate, and 92% by weight ethylene based on the total weight of the monomers of the acid copolymer and had a melt index of 10 dg/min.

Example 12 was a polymer blend prepared from 95% by weight LDPE 6211 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 13 was a polymer blend prepared from 95% by weight LDPE 5005 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 14 was a polymer blend prepared from 95% by weight LDPE 722 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 15 was a polymer blend prepared from 95% by weight LDPE PG 7008 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 16 was a polymer blend prepared from 95% by weight LDPE 4010 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 17 was a polymer blend prepared from 95% by weight LDPE 4016 manufactured by Dow, Inc. as the LDPE component and 5% by weight acid copolymer. The acid copolymer included 9% by weight methacrylic acid, and 91% by weight ethylene based on the total weight of the monomers of the acid copolymer and had a melt index of 10 dg/min.

Example 18 was a polymer blend prepared from 95% by weight LDPE 6211 manufactured by Dow, Inc. as the LDPE component and 5% by weight acid copolymer. The acid copolymer included 10% by weight methacrylic acid, and 10% of iso-butyl acrylate, and 80% by weight ethylene based on the total weight of the monomers of the acid copolymer and had a melt index of 10 dg/min.

Example 19 was a polymer blend prepared from 95% by weight LDPE 5005 manufactured by Dow, Inc. as the LDPE component and 5% by weight acid copolymer. The acid copolymer included 10% by weight methacrylic acid, and 10% of iso-butyl acrylate, and 80% by weight ethylene based on the total weight of the monomers of the acid copolymer and had a melt index of 10 dg/min.

Example 20 was a polymer blend prepared from 95% by weight LDPE 722 manufactured by Dow, Inc. as the LDPE component and 5% by weight acid copolymer. The acid copolymer included 10% by weight methacrylic acid, and 10% of iso-butyl acrylate, and 80% by weight ethylene based on the total weight of the monomers of the acid copolymer and had a melt index of 10 dg/min.

Example 21 was a polymer blend prepared from 95% by weight LDPE PG 7008 manufactured by Dow, Inc. as the LDPE component and 5% by weight acid copolymer. The acid copolymer included 10% by weight methacrylic acid, and 10% of iso-butyl acrylate, and 80% by weight ethylene based on the total weight of the monomers of the acid copolymer and had a melt index of 10 dg/min.

Example 22 was a polymer blend prepared from 95% by weight LDPE 4010 manufactured by Dow, Inc. as the LDPE component and 5% by weight acid copolymer. The acid copolymer included 10% by weight methacrylic acid, and 10% of iso-butyl acrylate, and 80% by weight ethylene based on the total weight of the monomers of the acid copolymer and had a melt index of 10 dg/min.

Example 23 was a polymer blend prepared from 95% by weight LDPE 4016 manufactured by Dow, Inc. as the LDPE component and 5% by weight acid copolymer. The acid copolymer included 10% by weight methacrylic acid, and 10% of iso-butyl acrylate, and 80% by weight ethylene based on the total weight of the monomers of the acid copolymer and had a melt index of 10 dg/min.

Example 24 was a polymer blend prepared from 97% by weight AGILITY™ EC 7030 manufactured by Dow, Inc. as the LDPE component and 3% by weight acid copolymer. The acid copolymer included 4% by weight methacrylic acid, and 15% of iso-butyl acrylate, and 81% by weight ethylene based on the total weight of the monomers of the acid copolymer and had a melt index of 27 dg/min (g/10 mins).

Example 25 was a polymer blend prepared from 97% by weight AGILITY™ EC 7000 manufactured by Dow, Inc. as the LDPE component and 3% by weight acid copolymer. The acid copolymer included 4% by weight methacrylic acid, and 15% of iso-butyl acrylate, and 81% by weight ethylene based on the total weight of the monomers of the acid copolymer and had a melt index of 27 dg/min (g/10 mins).

Characteristics of each of the polymer blends and comparative polymers are summarized in Table 2.

TABLE 2

Polymer Blend Peel Strength

| Run | Average peel strength mean (N/in) Absolute* | Peel strength improved (N/in)** | Peel Strength improved (%)*** |
|---|---|---|---|
| LDPE Homopolymers | | | |
| Agility EC 7030 | 1.56 | — | — |
| Agility EC 7000 | 0.62 | — | — |
| LDPE 5005 | 0.20 | — | — |
| LDPE 722 | 0.11 | — | — |
| LDPE PG 7008 | 0.12 | — | — |
| LDPE 4010 | 0.06 | | |
| LDPE 4016 | 0.07 | | |
| Examples | | | |
| Example 1 | 2.10 | 0.6 | 35 |
| Example 2 | 2.49 | 0.9 | 60 |
| Example 3 | 2.56 | 1.0 | 65 |
| Example 4 | 1.72 | 1.1 | 175 |
| Example 5 | 2.96 | 2.3 | 375 |
| Example 6 | 1.02 | 0.8 | 418 |
| Example 7 | 0.80 | 0.7 | 591 |
| Example 8 | 0.75 | 0.7 | 1012 |
| Example 9 | Not processable**** | | |
| Example 10 | 0.55 | 0.4 | 401 |
| Example 11 | 0.16 | 0.1 | 163 |
| Example 12 | Not processable**** | | |
| Example 13 | 0.25 | 0.05 | 27 |
| Example 14 | 0.20 | 0.1 | 87 |
| Example 15 | 0.47 | 0.4 | 302 |
| Example 16 | 0.14 | 0.07 | 119 |
| Example 17 | 0.41 | 0.3 | 510 |
| Example 18 | Not processable**** | | |
| Example 19 | 0.32 | 0.12 | 24 |
| Example 20 | 0.17 | 0.06 | 53 |
| Example 21 | 0.32 | 0.21 | 178 |
| Example 22 | 0.12 | 0.06 | 100 |
| Example 23 | 0.29 | 0.22 | 334 |
| Example 24 | 2.35 | NA**** | NA |
| Example 25 | 2.96 | 2.3 | 375 |

*Peel bond strength is reported in average peel strength from 1 inch of extension to 4 inches of extension or until the sample fails if less than 4 inches; and the bonded substrate was an aluminum foil laminate.
**The Peel strength improved is the calculated by the difference between the peel strength of the pure LDPE and the peel strength of the LDPE and acid copolymer.
***The Peel strength improved (%) was calculated by the following formula:

$$\frac{(\text{adhesion strength of LDPE} + \text{ACR}) - (\text{adhesion strength of pure LDPE})}{\text{peel strength of pure LDPE}} * 100$$

****The blend cannot be run in an extrusion coating line with line speed of greater than 440 ft/min (134 meters per minute).

The addition of 5% by weight of an acid copolymer to a LDPE polymer resulted in a polymer blend having a greater peel strength than the LDPE polymer.

The invention claimed is:
1. A polymer blend comprising:
at least 90% by weight low density polyethylene (LDPE) polymer based on the total weight of the polymer blend, the LDPE polymer having a melt index (I2) from 2 g/10 min to 5.8 g/10 min as determined in accordance with ASTM D1238 (190° C., 2.16 kg), and a molecular weight distribution (MWD) from 5 to 10.5 as determined by a conventional gel permeation chromatography method; and from 1% to 10% by weight acid copolymer based on the total weight of the polymer blend, wherein the acid copolymer is a polymerized reaction product of:

at least 65% by weight ethylene, based on the total weight of the monomers present in the ethylene acid copolymer;

from 1% to 15% by weight monocarboxylic acid monomer, based on the total weight of the monomers present in the ethylene acid copolymer; and from 0 to 20% by weight alkyl acrylate monomer, based on the total weight of the monomers present in the ethylene acid copolymer.

2. The polymer blend of claim 1, wherein the LDPE polymer has a density of 0.910 g/cm³ to 0.935 g/cm³ and an MWD of 8.5 to 10.5.

3. The polymer blend of claim 1, wherein the melt index of the LDPE polymer is from 2 g/10 min to 4.5 g/10 min as determined in accordance with ASTM D1238 (190° C., 2.16 kg).

4. The polymer blend of claim 1, further comprising a linear low density polyethylene (LLDPE) polymer having a melt index (I2) from 0.5 g/10 min to 30 g/10 min as determined in accordance with ASTM D1238 (190° C., 2.16 kg), and a density of 0.910 g/cm³ to 0.935 g/cm³.

5. The polymer blend of claim 1, further comprising an ethylene copolymer having a melt index (I2) from 0.5 g/10 min to 30 g/10 min as determined in accordance with ASTM D1238 (190° C., 2.16 kg), wherein the ethylene copolymer comprises the reaction product of:

at least 50% by weight ethylene, based on the total weight of the monomers present in the ethylene acid copolymer; and from 0.1% to 40% by weight comonomer, based on the total weight of the monomers present in the ethylene copolymer, the comonomer being chosen from vinyl acetate, acrylate, or carboxylic acid comonomer.

6. The polymer blend of claim 1, wherein the polymer blend comprises from 2% to 6% by weight acid copolymer, based on the total weight of the polymer blend.

7. The polymer blend of claim 1, wherein the acid copolymer has a melt index (I2) from 2 g/10 min to 30 g/10 min as determined in accordance with ASTM D1238 (190° C., 2.16 kg).

8. The polymer blend of claim 1, wherein the alkyl acrylate monomer comprises methyl acrylate, ethyl acrylate, n-butyl acrylate, iso-butyl acrylate, or combinations thereof; and the monocarboxylic acid monomer comprises acrylic acid, methacrylic acid, or combinations thereof.

9. The polymer blend of claim 1, wherein the ethylene acid copolymer comprises at least 75% by weight ethylene monomer, based on the total weight of the monomers in the ethylene acid copolymer; from 2% to 6% by weight monocarboxylic acid monomer, based on the total weight of the monomers in the ethylene acid copolymer; and from 1% to 15% by wt. alkyl acrylate based on the total weight of the monomers in the ethylene acid copolymer.

10. A coated metal substrate comprising:
a metal substrate; and
a coating comprising the polymer blend of claim 1 adhered to the metal substrate.

11. The coated metal substrate of claim 10, wherein the metal substrate comprises aluminum.

12. The coated metal substrate of claim 10, wherein the coating has peel strength of at least 0.6 N/in as measured by ASTM F904.

13. The coated metal substrate of claim 10, wherein the coating has peel strength of at least 1 N/in as measured by ASTM F904.

14. The coated metal substrate of claim 10, wherein the coating has peel strength of at least 2 N/in as measured by ASTM F904.

15. An extruded article comprising the polymer blend of claim 1.

16. The polymer blend of claim 1, wherein the LDPE polymer has a density of 0.910 g/cm³ to 0.920 g/cm³.

17. The polymer blend of claim 1, wherein the LDPE polymer is a homopolymer.

18. The polymer blend of claim 1, wherein the ethylene acid copolymer from 0 to 15% by weight alkyl acrylate monomer, based on the total weight of the monomers present in the ethylene acid copolymer.

19. The polymer blend of claim 1, wherein the ethylene acid copolymer comprises at least 75% by weight ethylene monomer, based on the total weight of the monomers in the ethylene acid copolymer.

20. The polymer blend of claim 1, wherein:
the polymer blend comprises from 2% to 6% by weight acid copolymer, based on the total weight of the polymer blend; and
the ethylene acid copolymer comprises at least 75% by weight ethylene monomer, based on the total weight of the monomers in the ethylene acid copolymer.

* * * * *